United States Patent
Wang et al.

[11] Patent Number: 5,792,361
[45] Date of Patent: Aug. 11, 1998

[54] METHOD FOR TREATMENT OF AN AQUEOUS WASTE MATERIAL

[75] Inventors: Jianhua Wang, Tuxedo; Caifang Yin, Monroe, both of N.Y.

[73] Assignee: International Paper Company, Purchase, N.Y.

[21] Appl. No.: 618,096

[22] Filed: Mar. 19, 1996

[51] Int. Cl.$^6$ .............. C02F 1/62; C02F 11/14; C02F 11/18
[52] U.S. Cl. .............. 210/702; 210/751; 210/769; 210/719; 210/912
[58] Field of Search ............... 210/702, 769, 210/751, 719, 912

[56] References Cited

U.S. PATENT DOCUMENTS

| | | | |
|---|---|---|---|
| 2,233,108 | 2/1941 | Ness et al. | 48/216 |
| 2,536,028 | 1/1951 | Brothman et al. | 260/638 |
| 2,701,188 | 2/1955 | Ritter et al. | 48/48 |
| 2,774,754 | 12/1956 | Schnell | 260/124 |
| 3,226,190 | 12/1965 | Rosenfeld | 23/131 |
| 3,623,975 | 11/1971 | Cardinal, Jr. et al. | 210/6 |
| 3,926,129 | 12/1975 | Wall | 110/7 B |
| 4,073,242 | 2/1978 | Wagner | 110/8 R |
| 4,079,003 | 3/1978 | Manchak | 210/46 |
| 5,242,601 | 9/1993 | Manchak, Jr. et al. | 210/711 |
| 5,284,630 | 2/1994 | Bunger et al. | 422/189 |

*Primary Examiner*—Neil McCarthy
*Attorney, Agent, or Firm*—Luedeka, Neely & Graham

[57] ABSTRACT

The invention is directed to a method for treating an aqueous waste material in order to reduce the volume of the material for disposal and/or landfill. In the method, an aqueous waste material containing organic compounds is contacted with calcium carbide under conditions which cause water and calcium carbide to react to produce acetylene and a residue. The acetylene is burned in the presence of the residue to further reduce the volume of material for disposal.

19 Claims, 3 Drawing Sheets

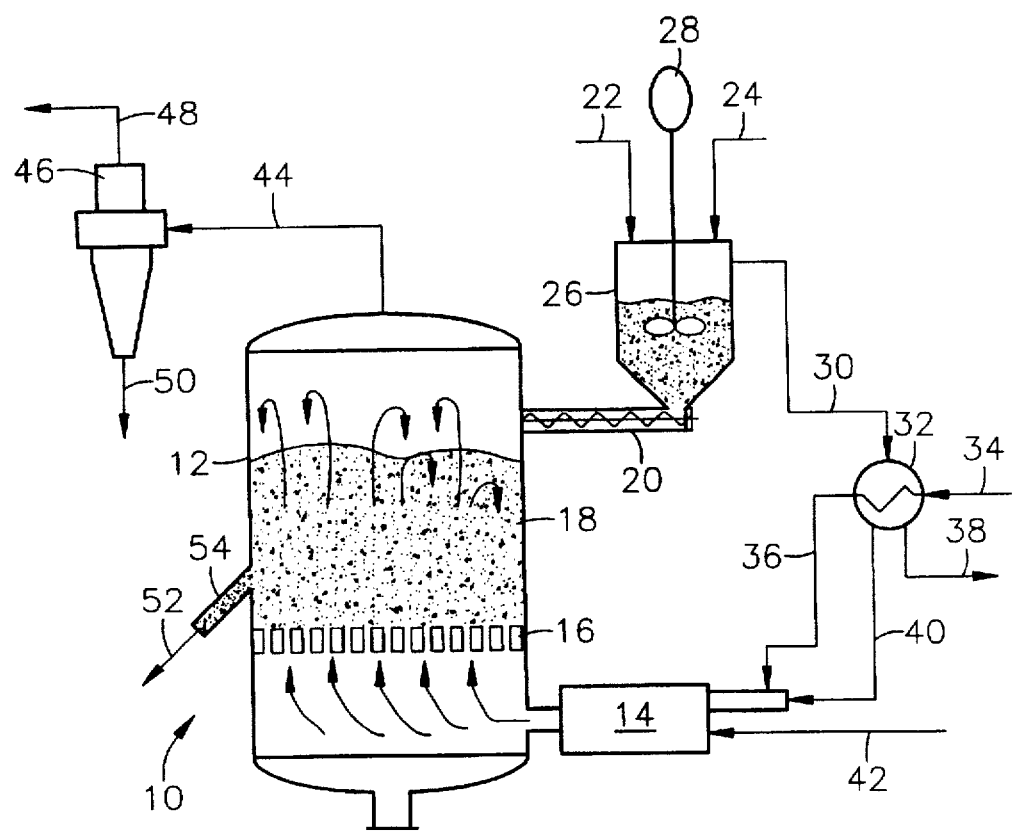
*Fig.* 1
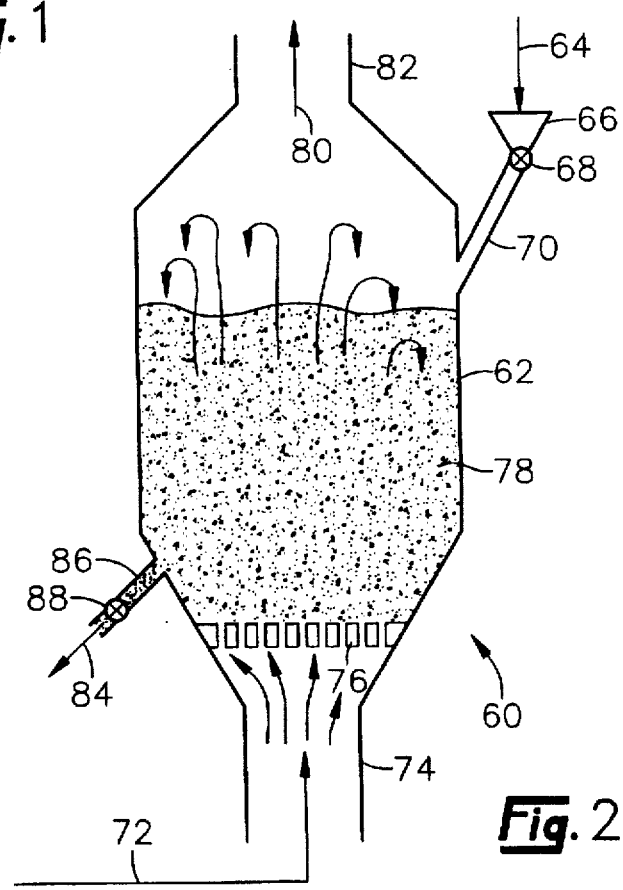
*Fig.* 2

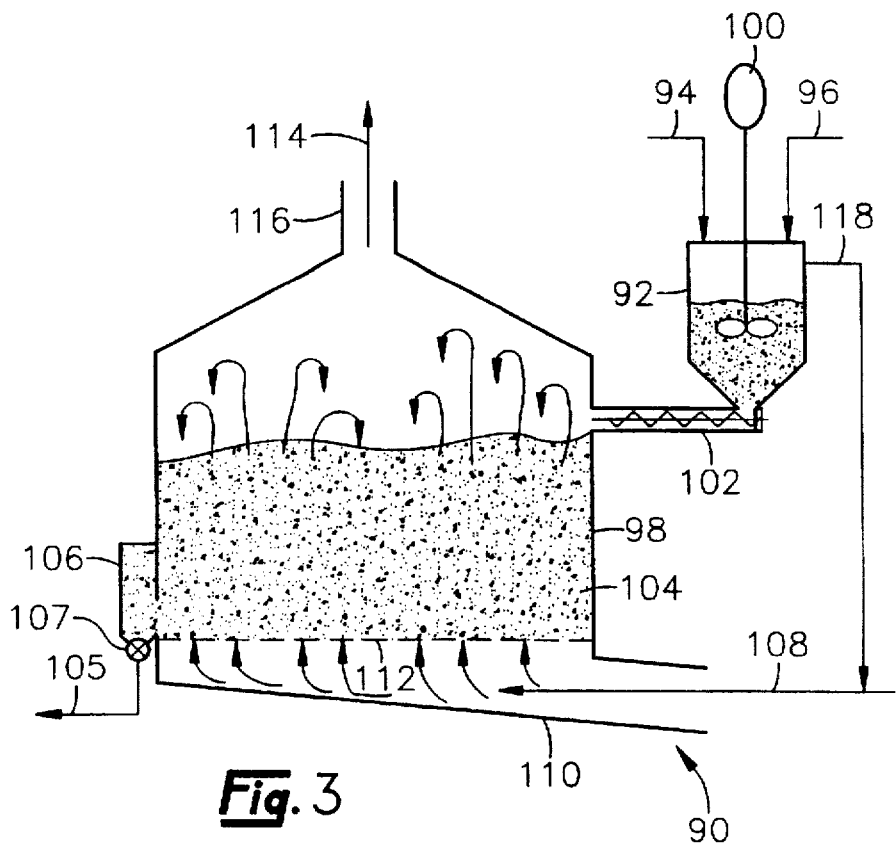
*Fig.* 3
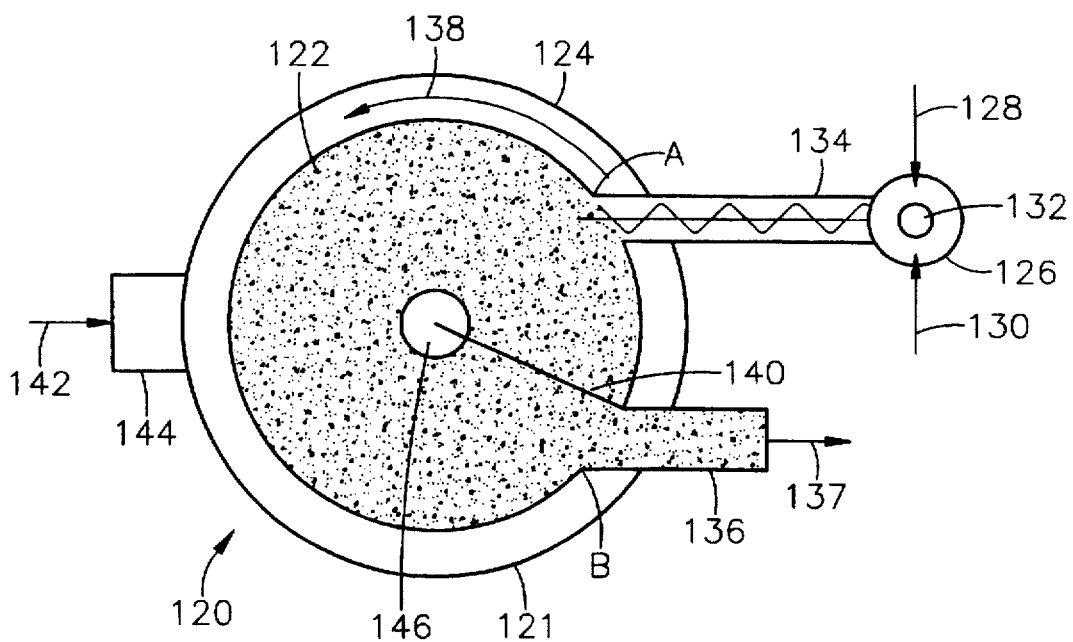
*Fig.* 4

METHOD FOR TREATMENT OF AN AQUEOUS WASTE MATERIAL

FIELD OF THE INVENTION

The present invention relates to a method for the treatment and disposal of wastewater or sludges, particularly hazardous wastewater or sludges in a cost effective manner.

Background

Many treatment schemes have been devised over the years for the treatment of liquid waste material from industrial and military processes. Processes generating waste material for treatment include petroleum and oil refining, agriculture, wood preserving, mineral processing, metal processing, coal tar and manufactured gas plants, paper production, and military operations. The waste material from such processes may include, but is not limited to, wastewater, contaminated soils, groundwater, and waste sludges which may contain acids, bases, solvents, hydrocarbon and polycyclic aromatic compounds, explosives, heavy metals, radioactive materials and other toxic compounds.

Processes for the treatment of waste materials include coagulation, precipitation, flocculation, evaporation, filtration, extraction, incineration, reverse osmosis, scrubbing, carbon adsorption, ion exchange, electrodialysis, ultrafiltration, decantation, settling, biotreatment and the like. Often the treatment schemes are directed to specific waste streams and are not readily adaptable to widely varying waste streams. Furthermore, streams containing very low concentrations of waste material typically require extremely expensive treatment processes in order to remove or otherwise dispose of the hazardous components in the waste streams. Waste streams which are mostly water often require additional processing steps in order to reduce the water content of the stream before or after treatment, particularly if the waste stream is to be landfilled or incinerated. Waste streams having a solids content of about 15 percent by weight or more are referred to herein as sludges.

A method for treating a sludge waste stream is disclosed in U.S. Pat. No. 5,242,601 to Manchak, Jr. et al. In the Manchak, Jr. et al. process a sludge having a moisture content of about 85 to about 90% by weight is combined in a mixing vessel with a treatment agent comprised of calcium oxide and calcium carbide. Steam, ammonia and acetylene are removed from the mixing vessel and the treated sludge is then incinerated.

In the Manchak Jr. et al. process calcium oxide is a required component of the sludge treatment process and, once treated, the sludge is burned at a temperature sufficient to convert essentially all of the calcium hydroxide formed by the reaction of calcium carbide with water into calcium oxide. Acetylene and ammonia are removed from the mixing vessel and the acetylene is scrubbed to remove the ammonia and/or burned off to the atmosphere. At the temperatures required to completely calcine the calcium hydroxide, a significant quantity of fuel is required. After the incineration step, a substantial portion of the calcium oxide is repeatedly recycled to the process. Hence, the Manchak Jr. et al. process relies on the use and recycle of calcium oxide to react with most of the water in the sludge in order to reduce the water content of the sludge.

Accordingly, it is an object of the present invention to provide an improved treatment method for wastewater and/or sludges.

Another object of the invention is to remediate a wastewater and/or sludge stream using a cost effective treatment method.

Still another object of the invention is to significantly reduce the volume of material from a wastewater and/or sludge stream that must be landfilled.

An additional object of the invention is to remediate a wastewater or sludge stream in a manner which produces a substantially non-hazardous solid or semi-solid material that may be recycled to the process, used for effluent treatment or used in the manufacture of building materials.

SUMMARY OF THE INVENTION

With regard to the above and other objects, the present invention provides a method for treating an aqueous waste material. The method comprises mixing the material with calcium carbide to produce acetylene and a residue. The acetylene is burned in the presence of the residue which produces energy to dry the residue to a higher solids concentration for burning.

The method of the invention initially reduces the amount of water in the waste material by reaction between the water and $CaC_2$, and offers the further advantage that acetylene produced by the reaction is used to heat and/or burn the residue, thereby driving additional water from the residue. As a result, the volume of residue to be disposed of may be significantly reduced with materials and energy available directly from the initial reaction step. Also, the solid byproducts of the burning step may be collected and used for pretreatment of the aqueous waste prior to contacting the waste with $CaC_2$ to remove water ($CaO+2\ H_2O \rightarrow Ca(OH)_2$) and to increase waste pH which causes metals to precipitate thereby reducing metal salts toxicity and reducing toxic air emissions from burning the residue.

In another embodiment, the invention provides a process for treating wastewater and sludges. The process comprises contacting calcium carbide with wastewater or sludge containing at least about 80 wt. % water to provide a reaction mass. During or subsequent to the contacting step, the reaction mass is mixed under conditions sufficient to cause substantially all of the calcium carbide to react to form a product containing calcium hydroxide, acetylene and a residue. At least a portion of the acetylene is collected from the product and the collected acetylene is heated and/or burned in the presence of the residue. Without intending to limit the invention, it is preferred to contact the calcium carbide and wastewater or sludge in a separate pre-mix vessel to form a reaction mass and to further mix and burn the reaction mass in a fluidized bed reaction vessel. The residue in the product obtained as a result of contacting calcium carbide with the wastewater or sludge may be heated and/or burned in a separate incineration chamber or in the fluidized bed reaction vessel provided the reaction vessel is designed for incineration conditions.

BRIEF DESCRIPTION OF THE DRAWINGS

The above and other features and advantages of the invention will now be further described in the following detailed specification in conjunction with the accompanying drawing in which:

FIG. 1 is a flow diagram of a process according to the invention illustrating the main features thereof;

FIG. 2 is a flow diagram of an alternative fluidized bed reactor system according to the invention;

FIG. 3 is a flow diagram of another fluidized bed reactor system according to the invention;

FIG. 4 is a plan view of a fluidized bed reactor system illustrating another arrangement of the system of FIG. 3;

DETAILED DESCRIPTION

Figure 5:
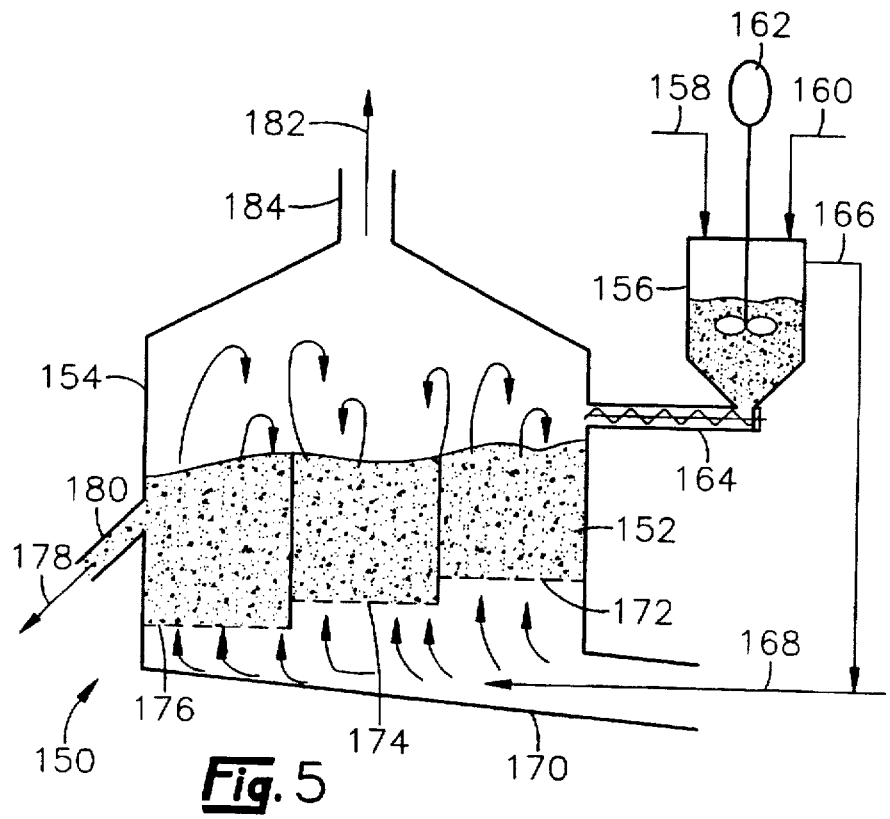
FIG. 5 is a flow diagram of a process according to the invention using a multi-section fluidized bed reactor.

In the method of the present invention, an aqueous waste material is contacted with calcium carbide under conditions which cause the water and calcium carbide to react, forming acetylene and calcium hydroxide. Not only is the amount of water in the waste reduced due to the reaction with the calcium carbide, but the exothermic reaction between the calcium carbide and water drives additional water from the waste by evaporation leaving a residue having a significantly reduced water content and thus a reduced volume. The residue may be heated and/or burned with the acetylene with or without additional fuel to an ash residue. During burning, the organics are oxidized to $CO_2$ and water while metallic salts are reduced by $CaC_2$ to their elemental state thereby reducing the metal toxicity of the residue. As a result of the process of the invention, the volume of residue for disposal or landfill is greatly reduced as compared with conventional processes, and with considerable energy and material savings. The residue in the form of ash is substantially stable and can be safely disposed of on land or used as an additive in, for example, brick manufacture.

In the practice of the present invention, a wide variety of aqueous waste materials may be treated. For example, the process may be used to treat contaminated groundwater and sludges containing waste solvents, radioactive compounds, halogenated compounds, hazardous metals, hazardous metallic compounds and the like. The process is particularly effective on a concentrated wastewater or sludge stream which has previously been treated to reduce the volume of water in the waste stream. Accordingly, the process may be used for treating concentrated streams from primary treatment operations such as ultrafiltration, ion exchange, carbon adsorption, electrodialysis, the solutions obtained from scrubbing hazardous gaseous streams and/or from condensation reactions, sludges emitted from secondary and tertiary treatment operations and spent liquors containing solids from industrial operations including the spent liquors from kraft and sulfite cooking processes from paper mills which must be treated before disposal.

The process of the present invention is especially useful for aqueous waste materials which are difficult to dewater, such as secondary or tertiary sludges from paper mill wastewater treatment systems. The process may be used to increase a secondary or tertiary treatment sludge solids content to facilitate the final disposal to a landfill or incinerator. Until now, it has been difficult or costly to increase the solids content of such a pulp mill secondary or tertiary sludge, which conventionally contains from about 12 to about 18 wt. % solids, to above about 20 wt. % solids. Not only does the method according to the invention provide sludges having a consistency which is suitable for landfilling, but the sludge may be further dewatered and/or burned to ash using acetylene generated from the reaction between the calcium carbide and water.

The invention also lends itself to a wide range of different embodiments in practice, and is therefore versatile and flexible in application. Hence, the method may be adapted to treat liquids, solids and even gaseous waste materials containing moisture. Many types of waste materials may be treated without any significant change in present process equipment or process steps, thereby increasing the savings obtained by use of the method of the invention.

Another advantage of the process of the invention is that calcium carbide acts as a reducing agent for metal compounds which may be in the waste material. For example, copper sulfide may be reduced to metallic copper by the reaction of an aqueous waste containing copper sulfide with calcium carbide. Accordingly, metal compounds in the waste may be converted to non-toxic and substantially stable metallic elements which remain with the ash or residue resulting from the subsequent heating and/or burning of the residue.

A key aspect of the invention is the step of contacting an aqueous waste material with calcium carbide. The contacting step may be conducted either in a fluidized bed, in a vessel containing a mixing device or in a pre-mix vessel prior to introducing the waste material and calcium carbide into a reaction vessel. The contacting is preferably conducted at a controlled rate under gentle agitation or mixing in order to provide essentially complete reaction of the calcium carbide with water. Because the reaction between calcium carbide and water is so rapid and exothermic, the feed rate of waste material and/or calcium carbide to the reactor and/or pre-mix vessel and the agitation conditions in the vessel are controlled so that essentially all of the calcium carbide fed to the vessel is reacted while maintaining suitable temperatures and pressures in the vessel according to the equipment design parameters.

In order to insure substantially complete reaction of the calcium carbide with water in the material to be treated, the contacting, mixing and reaction steps should be conducted for a period of time ranging from at least about 10 seconds to about 1 hour or more depending on the scale of the reaction. An additional amount of water may be added to the residue from the reaction vessel to react with any unreacted calcium carbide provided the residue is not returned to the pre-mix vessel.

A preferred apparatus for reacting the wastewater or sludge stream with calcium carbide is a fluidized bed reaction vessel. Calcium carbide in particulate form may be present in the reaction vessel before feeding in the waste material to be treated or the calcium carbide and waste material may be premixed and added as a premixed stream to the reaction vessel. For direct feed to the reaction vessel, once the calcium carbide is in a fluidized state, the waste material may be directed into the fluidized particle mass at a controlled rate in a manner known to those of ordinary skill. For example, a black liquor gun may be used to feed and distribute the waste material across the cross-sectional area of the reaction vessel. Because of the exothermic reaction between water and calcium carbide, it is preferred to conduct the contacting step between the waste material and calcium carbide in an insulated reaction or mixing vessel. It may also be advantageous to react the calcium carbide and waste material in a batch reaction so that control of the reaction temperature is more easily accomplished with conventional process equipment.

During or prior to the reaction, heat may be added to the mixture or reaction mass by use of an external heating source in order to evaporate additional water from the waste material. Heat may also be recovered during the burning step and used to preheat and evaporate water from the aqueous waste material prior to feeding the waste material to the pre-mix vessel and/or reaction vessel.

The pressure under which the treatment takes place is not believed to be critical to the method of the invention.

Accordingly, the pressure in the reaction and/or premix vessel may range from atmospheric, to subatmospheric to superatmospheric.

In a continuous reaction system, calcium carbide and the waste material may be fed substantially continuously to the pre-mix and/or reaction vessel to achieve essentially steady state reaction conditions. Acetylene is preferably collected from the gas leaving the pre-mix vessel and/or reaction vessel as it is formed and is fed to the suction side of a blower which is used to provide fluidizing gas to the fluidized bed reaction vessel. The acetylene returned to the vessel flows through the bed with the fluidizing gas joining any carry through acetylene produced in the contacting step and is burned in the presence of the reactants thereby forming product residue. The residue can be recycled to the mixing vessel and/or safely disposed of and/or used as an additive for the manufacture of bricks.

The amount of calcium carbide mixed with the waste material should be sufficient to react with water in the waste material and to produce an amount of acetylene which is sufficient to heat or burn the residue. Since the reaction between calcium carbide and water is exothermic, water vaporization from the waste may also take place as a result of heat produced from contacting and mixing the waste material and calcium carbide. When the aqueous waste also contains hazardous or toxic metal compounds, additional calcium carbide may be required to react with and reduce the metallic compounds to their elemental state in addition to the amount of calcium carbide required for reacting with water in the waste material. Accordingly, it is preferred to use a slight excess of calcium carbide to react with the water and/or metallic compounds in order to produce sufficient acetylene for use in heating or burning the waste residue.

Thus, the heating or burning step of the process which follows or occurs with the calcium carbide reaction step may be conducted in the same vessel used to contact the aqueous waste, or in a separate vessel. If the fuel value of the residue is too low for sufficient combustion, additional fuel may be added to aid in the heating and combustion of the residue. Alternatively, the addition of calcium carbide may be increased to produce more acetylene, remove more water and produce more heat to aid in heating and burning the waster material being treated.

With reference now to FIG. 1, a treatment system 10 according to the invention may comprise at least one reaction vessel 12, which may use a fluidizing gas blower 14 and distributor 16 or other means for gently mixing the reactants. Other means may include a mechanical mixer, a recirculation pump and the like. The reaction vessel 12 preferably contains a bed of calcium carbide solid particles 18, most preferably a fluidized or agitated bed of calcium carbide solid particles, into which an aqueous waste material is directed by means of feed mechanism 20 having a suitable distributor means for efficient introduction of the material into the reaction vessel 12. The feed mechanism may be a screw conveyor, positive displacement pump, slurry pump or the like and the distributor means may be a black liquor gun or similar device for distributing a slurry in a reaction vessel. It is preferred to pre-mix the calcium carbide 22 and waste material 24 in a pre-mix vessel 26 having an agitator 28 or other suitable mixing device for gently mixing the calcium carbide with the waste. As the reaction between the calcium carbide and water in the waste material proceeds, acetylene and water vapor are formed and exit the pre-mix vessel 26 through exhaust conduit 30. When treating a gaseous aqueous waste stream, the feed of waste material may be directly to a lower portion of the fluidized bed reaction vessel 12 so that the gaseous material flows into and through the fluidized bed of calcium carbide 18 in intimate contact therewith.

Water in the vapor stream exiting the pre-mix vessel 26 may be removed by use of condenser 32 or another suitable dewatering device. The acetylene and water vapor exiting the pre-mix vessel 26 through conduit 30 may be cooled by a cooling fluid or by the fluidizing gas which is preheated in the condenser 32 by flowing the fluidizing gas into the condenser through conduit 34 and out of the condenser through conduit 36 while the vapor stream flows through the condenser through conduit 30 and out through conduit 40. Condensate is removed from the condenser 32 by means of conduit 38, while the cooled acetylene is directed to the suction side of blower 14 by means of conduit 40. Additional air or fuel may be provided to the suction side of blower 14 by means of conduit 42. While FIG. 1 depicts a continuous or semi-continuous operation, it will be recognized that the acetylene produced by reaction between calcium carbide and water may also be collected and stored under pressure for later use in burning the residue resulting from the reaction between calcium carbide and the waste material.

In order to reduce the amount of particulates exiting the reaction vessel 12 through exhaust conduit 44, a cyclone separator or baghouse 46 may be used to separate particulate material from the combustion products. Accordingly, essentially particulate free exhaust gases will exit the separator 46 through exhaust conduit 48, while the particulate solid material may be removed from the separator 46 though conduit 50. Solids or ash 52 from combustion having a reduced water content may be removed from the reaction vessel 12 through conduit 54.

FIG. 2 illustrates an alternative reactor apparatus 60 wherein waste material and/or additional calcium carbide 64 are fed directly to a fluidized bed reaction vessel 62 through feed port 66, inlet valve 68 and inlet conduit 70 and a suitable distribution means as described above. A fluidizing gas 72 which may contain acetylene is fed into the vessel through inlet 74 and distributor 76 in an amount sufficient to fluidize the calcium carbide and waste mixture 78 in the reaction vessel. As the reaction between calcium carbide and water occurs, acetylene 80 is produced and exits the reaction vessel 62 through exit port 82. A purge stream 84 containing waste solids and/or sludge may be removed from the reaction vessel 62 continuously or intermittently through discharge conduit 86 and discharge valve 88.

If burning or heating the sludge does not take place in the fluidized bed reaction vessel, the residue 84 may be fed to the incineration vessel (not shown) for burning or heating the waste to further reduce the water content thereof. In such a case, the acetylene 80 produced during reaction is removed from the fluidized bed reaction vessel by means of a blower or other suitable gas movement device and is burned in the separate incineration vessel with the residue or compressed and stored for later use. Auxiliary equipment such as a condenser, blower and cyclone separator, illustrated and described with reference to FIG. 1 may also be used with the reactor system 60 of FIG. 2.

FIG. 3 is a flow diagram which illustrates the main aspects of another reactor system 90 according to the invention. The reactor system 90 may be operated on a batch, semicontinuous or continuous basis to reduce the water content and to burn an aqueous waste material. As illustrated in FIG. 3, the reactor system 90 contains a pre-mix vessel 92 for premixing a waste stream 94 and calcium carbide particles 96 prior to introducing the mixed stream to a fluidized bed reaction vessel 98. A mixing device 100 may be used to gently mix the reactants in the pre-mix vessel 92 before feeding the reactants to the reaction vessel 98 by means of feed device 102. The feed device 102 may be a screw conveyor, slurry pump, vibrational conveyor or other motive device for transferring the mixed reactants from the premix mix vessel 92 to the reaction vessel 98.

The reaction vessel 98 contains a fluidized reaction mass 104 comprising calcium carbide and waste. The reaction mass 104 is caused to move across the reaction vessel 98 from the inlet side adjacent the feed device 102 to a discharge side 106 which is opposite the inlet side of the reaction vessel 98 by continuous feed of reactants to the reaction vessel 98 and continuous discharge of residue therefrom. Solids or slurry 105 after mixing and reacting exit the reaction vessel 98 though exit valve 107 and exit conduit 106. Fluidizing gas 108 enters the reaction vessel 98 through fluidizing gas inlet 110 and is distributed across the cross-sectional area of the reaction vessel 98 below the reaction mass 104 by distributor 112.

Burning of the waste material and acetylene may take place directly in the reaction vessel 98 or in a separate incineration vessel. When the acetylene is burned in the reaction vessel, it may be combined with acetylene generated in the pre-mix vessel 92 which may be fed directly into the reaction vessel or may flow through conduit 118 and be combined with the fluidizing gas in conduit 108. If desired, the acetylene may also be cooled and the water vapor removed before feeding the acetylene from the pre-mix vessel 92 to the reaction vessel 98. Exhaust gases 114 resulting from the burning of acetylene and the waste material in the reaction vessel 98 exit the reaction vessel through exit port 116. If the exhaust gases 114 contain particulate or hazardous materials, a cyclone separator, baghouse or scrubber may be used to clean the exhaust gases before discharging the gases to the atmosphere.

In FIG. 4, there is illustrated, in plan view, a similar reactor system 120 to the reactor system 90 illustrated in FIG. 3. In the system depicted in FIG. 4, the reaction mass 122 moves in a generally circular path with respect to the vessel walls 124 to provide additional residence time for reaction. A pre-mix vessel 126 provides for premixing an aqueous waste stream 128 with calcium carbide particles which are introduced to the pre-mix vessel through conduit 130. The pre-mix vessel 126 also contains a mixing device 132 for gently mixing the reactants. A feed device 134 such as a screw conveyor, slurry pump, vibrating feeder or the like may be used to introduce the mixed reactants to the reaction vessel 121 so that the reactants enter the reaction vessel at point A. During the reaction, the entire reaction mass 122 is rotated in the direction indicated by arrow 138 so that the reaction mass 122 moves with respect to the vessel walls 124 from the inlet of the reaction vessel at point A to the exit of the reaction vessel at point B. Slurry or solids resulting from the reaction of the aqueous material with calcium carbide are discharged from the reaction vessel 121 through discharge port 136 and discharge conduit 137. A stationary baffle 140 may be used to separate the incoming reactants from the spent reactants as the reaction mass is rotated from the inlet A to the exit B of the reaction vessel.

Fluidizing gas 142 enters the reaction vessel through gas inlet 144 below the reaction mass 122 and is distributed by a distributor across the cross-sectional area of the reactor. Acetylene, fluidizing gas and/or exhaust gases exit the reaction vessel 121 through exhaust port 146.

FIG. 5 illustrates yet another reactor system 150 wherein the reaction mass 152 cascades from one section to another within a multi-section fluidized bed reaction vessel 154. As with the systems illustrated in FIGS. 1, 3 and 4, there is a pre-mix vessel 156 for premixing a waste material stream 158 with particulate calcium carbide 160. The contents of the pre-mix vessel 156 may be gently mixed by agitator 162 or other suitable mixing device. The mixed reactants are fed into the reaction vessel 154 by means of feed device 164 which is used to control the rate of reactant feed to the fluidized bed. Acetylene produced in the pre-mix vessel 156 by reaction between calcium carbide and water in the waste material, may be directed to the fluidizing gas through conduit 166 or directly to the reaction vessel before or after removing water vapor from the acetylene by use of a condenser as illustrated in FIG. 1. The acetylene may also be mixed with the fluidizing gas 168 which enters the lower section of the reaction vessel 154 through inlet 170 and is distributed to the various sections of the reaction vessel by means of distributors 172, 174 and 176.

Ash or slurry residue 178 is discharged from the reaction vessel 154 through outlet 180 for further treatment, recycle, landfill, or use in pretreating the waste material prior to reacting the waste material with calcium carbide. Waste material in the reaction mass 152 may be burned with acetylene produced by the reaction directly in the reaction vessel 154. Exhaust gases 182 resulting from burning of the waste material and acetylene exit the reaction vessel through exhaust gas outlet 184. The exhaust gases may be further treated to remove any particulate or hazardous materials before discharging the gases to the atmosphere.

Figure 6:
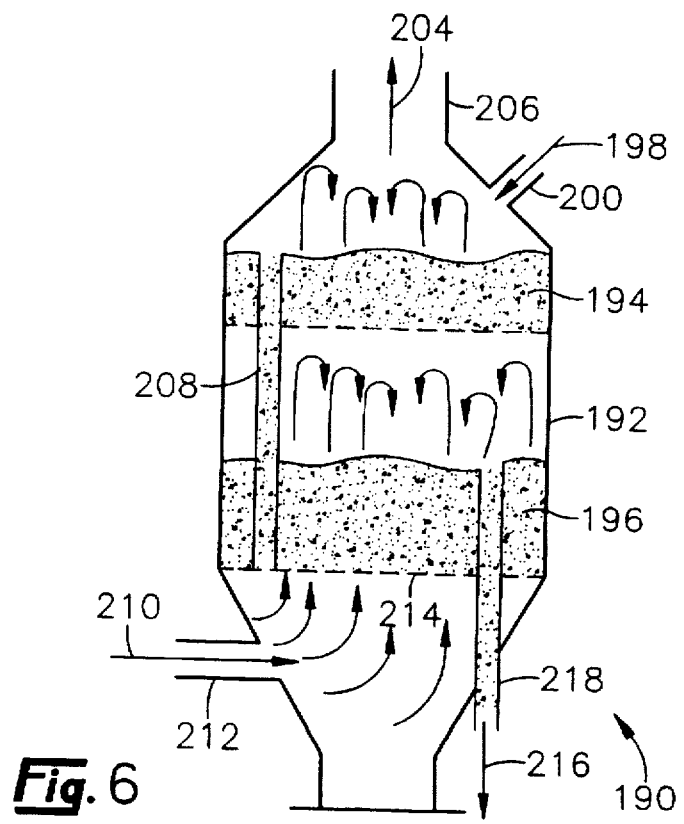
FIG. 6 is yet another flow diagram of a multi-level fluidized bed reactor system for conducting the process according to the invention.

A multi-level fluidized bed reactor system 190 is illustrated in FIG. 6. The multi-level fluidized bed reaction vessel 192 may be used to treat waste according to the invention. The reaction vessel 192, illustrated in this embodiment, contains an upper fluidized bed 194 containing a reaction mass of calcium carbide and waste material, and a lower fluidized bed 196 which contains waste solids or slurry after essentially completing the reaction of the waste material with calcium carbide. A pre-mixed stream 198 containing calcium carbide solids and waste to be treated enters the reaction vessel 192 through inlet port 200 and is distributed within the upper portion of the reaction vessel by a suitable distribution device. An upper fluidizing gas distributor 202 maintains the reaction mass in the upper fluidized bed 194 in a fluidized state. As the calcium carbide reacts with water in the waste material, acetylene gas 204 is produced and is removed from the reaction vessel 192 through exhaust port 206 by use of a blower or other suitable gas handling device.

The reaction mass in the upper fluidized bed 194 overflows through downcomer conduit 208 which is in flow communication with the lower fluidized bed 196. In the lower fluidized bed, acetylene and the waste material after reaction with calcium carbide are burned to further reduce the water content of the waste material. Fluidizing gas, acetylene and/or additional fuel 2enter the reaction vessel 192 through fluidizing gas inlet port 212. A lower fluidizing gas distributor 214 is used to evenly distribute the fluidizing gas across the cross-sectional area of the reaction vessel so that the reaction mass in the lower fluidized bed 196 is maintained in a fluidized state for more efficient burning.

Ash and or slurry 216 are removed from the lower fluidized bed 196 by means of outlet conduit 218 which is in flow communication with the lower fluidized bed 196. The ash and/or slurry obtained by use of reactor system 190 may be landfilled or further treated as may be required by state and federal environmental regulations.

During any of the reaction and burning steps described above, the temperature of the reaction mass is preferably maintained above about 400° C. so that water is evaporated from the waste material. Accordingly, the reaction vessels and pre-mix vessels may be insulated to retain the heat of reaction and/or combustion and additional heat may be added to the reaction mass by heating the fluidizing gas, either directly or by exchange with the exhaust gases from the reaction vessel. Other means for heating the reaction mass are within the skill of those skilled in the art. The reaction vessel pressure is controlled at about atmospheric pressure by burning or removing vapors from the reaction vessel at a rate sufficient to maintain the pressure.

During the reaction and heating steps, it is preferred to maintain the waste material at an alkaline pH to facilitate burning and to reduce air emissions. This may be achieved by adding a base to the reaction vessel or by recirculating a portion of the concentrate or ash exiting the reaction vessel or incinerator back to the reaction vessel, provided the concentrate or ash contains sufficient calcium oxide and/or calcium hydroxide to achieve the alkaline pH without the addition of base. The dewatered sludge may also be used for pretreatment of the aqueous waste material and/or may be used in other water treatment operations since it often will contain a significant amount of calcium hydroxide formed by the reaction of water with calcium carbide.

The following non-limiting examples illustrate various additional aspects of the invention.

EXAMPLE 1

Calcium carbide (40 grams) was combined with 200 mL of contaminated groundwater in a shallow 500 mL vessel while gently stirring the mixture for 2-3 minutes. The groundwater had the following analytical characteristics:

| Color | 40,000 mg/L |
|---|---|
| COD (chemical oxygen demand) | 41,200 mg/L |
| BOD (biological oxygen demand) | 990 mg/L |
| ¾ methylphenol | 457 mg/L |
| pH | 8.4 |
| TSS (total suspended solids) | 153 mg/L |
| TDS (total dissolved solids) | 62,000 mg/L |
| Total Kjeldahl Nitrogen | 162 mg/L |
| TOC (total organic carbon) | 14,800 mg/L |
| Humic Acid | 12,200 mg/L |
| Arsenic | 5 mg/L |
| Cadmium | 0.12 mg/L |
| Chromium | 35 mg/L |
| Nickel | 2.3 mg/L |
| Vanadium | 8.4 mg/L |
| Zinc | 2.2 mg/L |

Upon adding the groundwater to the cylindrical pan, bubbles and foam as well as acetylene gas were formed by reaction between the water and the $CaC_2$. The acetylene gas was ignited with a match and a flame was generated on the top of the mixture indicating combustion of the acetylene gas. When all of the water in the groundwater sample was evaporated or reacted, the organics in the sample began to burn. As the combustion continued, carbon black from the organics in the groundwater was observed in the exhaust fumes and as deposits on the side of the container. Upon completion of the combustion of the organic material, an ash composition remained in the bottom of the container. The combustion process took about 10 minutes. Once the combustion was complete, an amount of water sufficient to consume any remaining $CaC_2$ was added to the container. The remaining ash composition was white in color, and contained dark particles, and had a volume of about 20 milliliters.

As illustrated by the foregoing example, a groundwater sample containing a significant amount of organic and inorganic material may be converted to an ash by reacting the water in the groundwater sample with calcium carbide and burning the reaction product with acetylene gas and with the organic material initially present in the sample. As the acetylene gas and organics burn, additional water is removed from the sample resulting in a solid or semi-solid ash having a greatly reduced volume compared to the initial sample.

EXAMPLE 2

Weak black liquor (50 mL) having a solids content of 15 wt. % from a kraft cooking process of a paper mill was added to a 500 mL shallow cylindrical pan containing 10 grams of calcium carbide while gently stirring the mixture for 2-3 minutes. During the addition of the weak liquor to the cylinder, bubbles and foam as well as acetylene gas formed as a result of the reaction between the calcium carbide and water. The acetylene gas was ignited with a match and a flame formed on the surface of the mixture. As the combustion continued, carbon black was observed in the exhaust gas and accumulated on the side of the container. When all of the water in the black liquor was reacted or evaporated, the organics in the sample began to burn.

When the combustion was complete, the resulting ash was white in color and the liquid supernatant had a yellowish tint. When the ash was dissolved in 10 mL of water, a green liquor was produced with a pH of over about 14 indicating the presence of NaOH. One or two drops of the green liquor were reacted with lead acetate which turned the liquor black, indicating the presence of $Na_2S$ as a result of the reduction of $NaSO_4$ with the calcium carbide.

The foregoing example illustrates the use of calcium carbide to reduce sodium sulfate to sodium sulfide as well as remove water from the sample. Accordingly, the supernatant liquor obtained by dissolving the residue obtained by reacting black liquor with calcium carbide may be recycled and reused in the papermaking process.

EXAMPLE 3

Secondary and tertiary sludges from a paper mill wastewater treatment plant were treated according to the process of the invention. The objective of the treatment was to increase the solids content of the sludge from about 15 wt. % to about 20 wt. %. In the first run, 44.5 grams of sludge containing 15 wt. % solids was mixed with 1.7 grams of calcium carbide in a 500 mL shallow cylindrical pan with gentle stirring for 20 minutes. The final weight of the sludge after reaction was 45.1 grams. The additional solids produced by reacting the sludge with calcium carbide was 2.1 grams. Since the initial solids content of the sludge before treatment was 6.7 grams the final residue has a solids content of 19.5 wt. %.

In the second run, 32.6 grams of sludge containing 15 wt. % solids was added to 2.1 grams of calcium carbide in a 500 mL shallow cylindrical pan with gentle stirring for 20 minutes. The final weight of the sludge after reaction was 33.8 grams. The solids produced by reacting the sludge with calcium carbide was 2.6 grams. The initial solids content of the sludge before treatment was 4.9 grams and the residue had a solids content of 22.2 wt. %.

As illustrated by the foregoing example, about 4 to about 6 wt. % calcium carbide may be used to increase the solids content of a paper mill sludge from about 15 wt. % to about 19 to 25 wt. %. The resulting acetylene gas produced by reacting the water in the sludge with calcium carbide may be burned to further evaporate water from the sludge and/or to reduce the amount of calcium carbide required to increase the sludge solids content. Accordingly, waste streams having a high organic content may be dewatered and/or combusted to reduce the volume of waste material to be landfilled or otherwise disposed of.

Having now described various embodiments and features of the invention, those of ordinary skill will appreciate that these embodiments are capable of numerous modifications, rearrangements and substitutions within the spirit and scope of the appended claims.

What is claimed is:

1. A method for treating an aqueous waste material which consists essentially of mixing the material with calcium carbide to produce acetylene gas and a residue containing water and burning the acetylene gas in the presence of the residue to vaporize water from the residue.

2. The method of claim 1 wherein the aqueous waste material contains one or more organic compounds and the energy produced by burning the acetylene is sufficient to ignite and burn the organic compounds.

3. The method of claim 2 wherein an amount of calcium carbide is used which is sufficient to react with water in the aqueous waste material to provide sufficient acetylene in combination with the one or more organic compounds for heating and burning the residue in order to drive essentially all remaining unreacted water from the residue.

4. The method of claim 3 further comprising collecting a byproduct comprising $Ca(OH)_2$ and/or CaO obtained as a result of heating and burning the residue and contacting the aqueous waste material with the byproduct in order to obtain a waste material having a pH above about 7.0.

5. The method of claim 1 further comprising collecting a byproduct comprising $Ca(OH)_2$ and/or CaO obtained from burning the residue and contacting the aqueous waste material with the byproduct in order to obtain a waste material having a pH above about 7.0.

6. The method of claim 1 further comprising reducing metal salts in the waste material to their elemental state and precipitating the metals.

7. A process for treating wastewater and sludges which consists essentially of:

mixing calcium carbide with wastewater or sludge containing at least about 80 wt. % water under conditions sufficient to cause calcium carbide to react with water in the wastewater sludge thereby forming reaction products comprising acetylene gas and a residue containing calcium hydroxide and water;

conducting the residue to a reaction vessel;

collecting at least a portion of the acetylene gas from the reaction products; and burning the collected acetylene gas in the presence of the residue in the reaction vessel to reduce the water content of the residue.

8. The process of claim 7 wherein an amount of calcium carbide is used which is sufficient to react with water in the aqueous waste material to provide sufficient acetylene for burning the residue in order to drive essentially all remaining unreacted water from the residue.

9. The process of claim 7 wherein the wastewater or sludge stream contains one or more organic compounds and the energy produced by burning the acetylene is sufficient to ignite and burn the organic compounds.

10. The process of claim 7 wherein an amount of calcium carbide is used which is sufficient to react with water in the aqueous waste material to provide sufficient acetylene in combination with the one or more organic compounds for burning the residue in order to drive essentially all remaining unreacted water from the residue.

11. The process of claim 10 further comprising collecting a byproduct comprising $Ca(OH)_2$ and/or CaO obtained as a result of burning the residue and contacting the aqueous waste material with the byproduct in order to obtain a waste material having a pH above about 7.0 prior to mixing the wastewater or sludge stream with the solid calcium carbide particles.

12. The process of claim 7 further comprising collecting a byproduct comprising $Ca(OH)_2$ and/or CaO obtained as a result of burning the residue and contacting the aqueous waste material with the byproduct in order to obtain a waste material having a pH above about 7.0 prior to mixing the wastewater or sludge stream with the solid calcium carbide particles.

13. The process of claim 7 further comprising reducing metal salts in the wastewater or sludge to their elemental state and precipitating the metals.

14. A substantially continuous process for treating an aqueous waste material which consists essentially of:

continuously feeding calcium carbide particles and an aqueous waste material through a mixing vessel to cause reaction of calcium carbide with water in the aqueous waste material to produce reaction products comprising acetylene gas and a residue containing calcium hydroxide and water;

continuously feeding the residue to a fluidized bed reaction vessel;

continuously collecting a least a portion of the acetylene gas from the reaction products; and continuously burning the collected acetylene gas in the presence of the residue in the reaction vessel to reduce the water content of the residue.

15. The process of Claim 14 wherein the aqueous waste material contains one or more organic compounds and the energy produced by burning the acetylene is sufficient to ignite and burn the organic compounds.

16. The process of claim 15 wherein an amount of calcium carbide is used which is sufficient to react with water in the aqueous waste material to provide sufficient acetylene in combination with the one or more organic compounds for burning the residue in order to drive essentially all remaining unreacted water from the residue.

17. The process of claim 16 further comprising collecting a byproduct comprising $Ca(OH)_2$ and/or CaO obtained as a result of burning the residue and contacting the aqueous waste material with the byproduct in order to obtain a waste material having a pH above about 7.0 prior to mixing the aqueous waste material with the calcium carbide.

18. The process of claim 14 further comprising collecting a byproduct comprising $Ca(OH)_2$ and/or CaO obtained as a result of burning the residue and contacting the aqueous waste material with the byproduct in order to obtain a waste material having a pH above about 7.0 prior to mixing the aqueous waste material with the calcium carbide.

19. The process of claim 14 further comprising reducing metal salts in the aqueous waste material to their elemental state and precipitating the metals.

* * * * *

UNITED STATES PATENT AND TRADEMARK OFFICE
CERTIFICATE OF CORRECTION

PATENT NO. : 5,792,361
DATED : August 11, 1998
INVENTOR(S) : Jianhua Wang and Caifang Yin It is certified that error appears in the above-identified patent and that said Letters Patent is hereby corrected as shown below:

Column 8, Line 54, after "acetylene and/or additional fuel" delete "2enter" and insert --210 enter--.

Column 9, Line 57, delete "bum" and insert --burn--.

In The Claims

Claim 7, Col. 11, Line 46, after "react with water in the" delete "wastewater sludge" and insert --wastewater or sludge--.

Signed and Sealed this

Eighth Day of December, 1998

Attest:

BRUCE LEHMAN

Attesting Officer

Commissioner of Patents and Trademarks